United States Patent [19]

Gugel

[11] Patent Number: 5,303,478
[45] Date of Patent: Apr. 19, 1994

[54] ELECTRIC HAND-HELD PORTABLE HACK-SAW

[76] Inventor: Leslie H. Gugel, 2701 27th Crt., Jupiter, Fla. 33477

[21] Appl. No.: 851,576

[22] Filed: Mar. 16, 1992

[51] Int. Cl.⁵ ............................................. B23D 49/12
[52] U.S. Cl. ....................................... 30/392; 30/507; 30/513
[58] Field of Search ................ 30/392, 509, 513, 369, 30/507, 514, 517

[56] References Cited

U.S. PATENT DOCUMENTS

| | | | |
|---|---|---|---|
| 1,324,032 | 12/1919 | Steenrad | 30/507 |
| 1,988,949 | 1/1935 | Kelley | 30/509 |
| 2,593,323 | 4/1952 | Magnussen et al. | 30/513 |
| 2,772,708 | 12/1956 | Miquel | 30/507 |
| 3,589,418 | 6/1971 | Clark | 30/513 |
| 3,840,059 | 10/1974 | Ingro | 30/514 |
| 4,949,464 | 8/1990 | Adomatis | 30/392 |
| 5,027,518 | 7/1991 | Adomatis | 30/513 |

FOREIGN PATENT DOCUMENTS 2075421 11/1981 United Kingdom .................. 30/392

*Primary Examiner*—Richard K. Seidel
*Assistant Examiner*—Hwei-Siu Payer

[57] ABSTRACT

This device consists of an encased, electrically powered motor housing unit with a first handle parallel in line to the height of the unit. Extending out from the top of the handle is a metal bar one inch in diameter which runs out forward from the motor housing unit to which is attached a second handle bar parallel in line to the first handle and the motor housing. Extending out from the bottom of this second handle is a metal rod with a spring and a bolt parallel in line to the metal bar. This metal rod has a hole in it for mounting one end of a metal hack-saw blade. The other end of the blade is to be mounted to a metal piece extending out from the bottom of the motor housing which when running moves back and forth, causing a sawing motion. Directly above the metal rod with a spring and directly above the metal piece is a metal bar to which is attached a roller to keep the hack-saw blade steady.

4 Claims, 1 Drawing Sheet

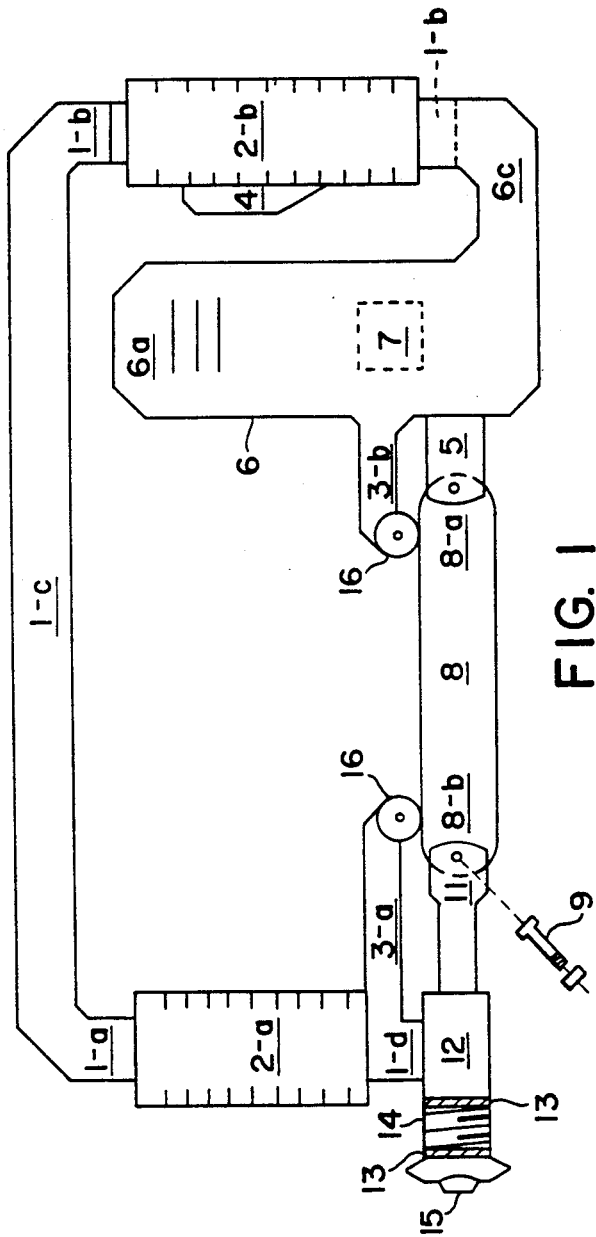
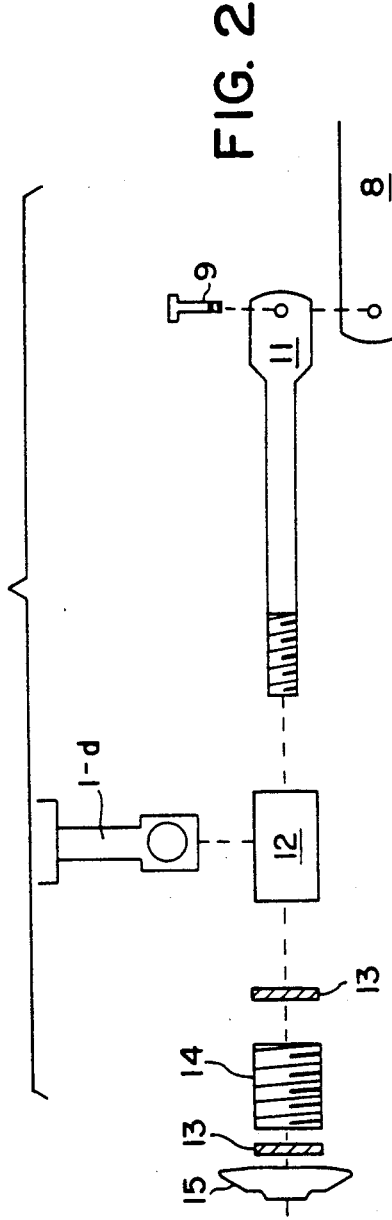
FIG. 2
FIG. 1

ELECTRIC HAND-HELD PORTABLE HACK-SAW

BACKGROUND

The technical field to which this device pertains would fall within the definition of metal sawing devices.

This specification describes a metal cutting device, more commonly referred to as a hack-saw, designed to be hand held and compact in size for portable use. The only known device in use at present time which would come close in description would be the portable band saw. This device, however, is bulkier in size, and consequently, in weight, and implements a a different method for cutting, i.e. a metal band attached to two common axes. While this device may be practical for cutting through larger sheets of metal, due to its size and weight, and hence cost, it is not practical for smaller operations such as cutting through metal pipe or rebar or for cutting bolts or screws. The device described herein is a lighter, more compact, and more economical approach with the same basic purpose in mind.

SUMMARY

This device is a metal cutting device, more commonly referred to as a hack-saw consisting of a motor housing unit encased in a u-shaped mainframe or casing fixedly mounted to a c-shaped frame supporting the outer end of a metal hack-saw blade having an inner end removably mounted to a reciprocably driven linkage connected to a 120 volt a.c. powered motor contained in a casing. The metal hacksaw blade is to be used for cutting through other metal objects. The advantage to this device herein described is that it allows for a much quicker and less tiring method for cutting through metal objects, since it is the only power device of its kind providing a quicker forward and backward motion for cutting. Also due to its lighter size and fewer parts in assembly, it provides a more cost-effective means of cutting through metal objects than other substitute devices in the market today.

BRIEF DESCRIPTION OF THE DRAWINGS

The illustration enclosed consists of two figures.

FIG. 1 is an overall view of the preferred embodiment.

FIG. 2 shows a break-down illustration of the spring housing assembly which is to be described in detail in the following description.

DETAILED DESCRIPTION OF THE PREFERRED EMBODIMENT

Number 1 represents the c-shaped frame of the cord operated electric metal cutting saw. This frame is of ¼ inch thickness by 1 inch diameter iron stock and can vary in diameter and thickness from 4 inches to 12 inches in height and 1 foot to 2 feet in length. Rubber grips 2-a and 2-b are of ½ to 1 inch diameter and are located on opposite sides of the c-shaped frame 1. Rubber grip 2-a is located on second leg 1-a of the c-shaped frame 1 with its base directly above roller arm 3-a. Rubber grip 2-b is mounted on second leg portion 6-b of u-shaped mainframe casing 6 and first leg portion 1-b of c-shaped frame 1. (since u-shaped casing 6, and c-shaped frame 1 are interconnected, they are both consequently mounted to the rubber grip 2-b). On-off switch 4 is mounted to the second leg portion 6-b of the u-shaped casing 6 and is operable to connect the a.c. power to the electric motor 7 resulting in rotation of the reciprocating output shaft 5. (let it be further known that rubber grip 2-b has an opening to allow for on-off switch 4). First leg 1-b of c-shaped frame 1 will be fixedly mounted within second leg 6-b of u-shaped casing 6 so that lateral portion 1-c of c-shaped frame 1 runs parallel with the hack-saw blade 8 and the second leg 1-a of the c-shaped frame 1 runs parallel with the first leg 6-a of the u-shaped casing mainframe 6. The u-shaped casing mainframe 6 consists of a first leg portion 6-a, a second leg portion 6-b, and a lateral portion 6-c. The lateral portion 6-c of the u-shaped mainframe casing 6 runs parallel with the lateral portion 1-c of the c-shaped frame 1. The first leg 6-a of the u-shaped casing 6 houses the motor means 7. Motor means 7 is connected to a reciprocating output 5 which extends from the base of the u-shaped casing mainframe 6 and to which is attached the proximal end 8-a of the hack-saw blade 8 by means of a lock-nut and bolt 9. The hack-saw blade 8 will be approximately 10 inches to 17 inches, including a proximal 8-a and distal 8-b end, and being of a rigid main body incapable of supporting itself during sawing without its distal end 8-b being supported. The spring means as shown consists of a first mount 11 which is inserted through the spring housing assembly 12. The threaded end of the first mount 11 is to be secured with a washer 13, a spring 14, a second washer 13, and a locking wing nut 15. The diameter of the first mount 11 is to be approximately 5/16 inch in diameter. At the base of the second end portion 1-d of the second leg 1-a of the c-shaped frame 1, there will be a hole. The hole opening is to run parallel with the lateral portion 1-c of the c-shaped frame 1 and is to allow for insertion of the housing assembly 12 so that housing assembly 12 is reciprocably and removeably mounted to the base of the second end portion 1-d of the c-shaped frame 1. At the end of the first mount 11 opposite the threaded end, there will be a hole for which to mount the distal end 8-b of the hack-saw blade 8 by means of a lock-nut and bolt 9. The length of the first mount 11 and the length of the spring 14 will be determined by the length and specifications of the saw blade 8. Wing nut 15 will be tightened snugly so as to leave spring 14 with ample release motion. There are as indicated in the diagram, two outwardly extending roller arms 3-a and 3-b which are present to maintain stability of the hack-saw blade 8 while it is moving. Roller arm 3-a is an outwardly extending arm fixedly mounted at the base of the second end portion 1-d of the c-shaped frame 1 directly above the spring housing assembly 12 and extending out parallel in line with the lateral portion 1-c of the c-shaped frame 1 and the hacksaw blade 8. To the end of the roller arm 3-a is attached a roller 16 which comes in contact with the hack-saw blade 8 while it is connected at the distal end 8-b. The roller arm 3-b is an outwardly extending arm fixedly mounted at the base of the first leg 6-a of the u-shaped mainframe casing 6 directly above the reciprocating output 5 and extending out parallel in line with the lateral portion 1-c of the c-shaped frame 1 and the hack-saw blade 8. To the end of the roller arm 3-b is attached a roller 16 which comes in contact with the hack-saw blade 8 while it is connected at the proximal end 8-a. The rollers 16 are rotateably mounted to the roller arms 3-a and 3-b.

Number 12, shown in FIG. 2, is the spring housing assembly which consists of the first mount 11, the lock-nut and bolt 9, the washers 13, the spring 14, and the locking wing nut 15. The illustration shows how the spring housing assembly 12 mounts to the base of the second end portion 1-*d* of the c-shaped frame 1, and how the first mount 11 is connected to the distal end 8-*b* of the hack-saw blade 8 and also secured to the spring housing assembly 12 by the means of the spring 14, washers 13, and locking wing nut 15. For the sake of understanding how the spring housing assembly 12 is inserted through the base of the second end portion 1-*d* of the c-shaped frame 1, a front view of the lower half of the second leg 1-*a* of the c-shaped frame 1 is shown.

The electric motor 7 housed within the grounded u-shaped mainframe casing 6 shall be 120 volts a.c. and at least 3200 rpm's. Also the motor 7 shall be double insulated at 2.2 amps. All of these factors apply to the description of the preferred embodiment herein described. Let it be also understood that although I have described this embodiment with certain specifications, these specifications as well as this description shall not be construed as limiting the ways in which this invention may be practiced, but shall be inclusive of many other variations that do not depart from the broad interest and intent of the invention.

What is claimed is:

1. A powered hack-saw comprising:
    a u-shaped mainframe,
    a hack-saw blade removably and reciprocably mounted to said u-shaped main frame and including a proximal end and a distal end, said hack-saw blade including a rigid main body incapable of supporting itself during sawing without said distal end supported,
    electric operated motor means mounted within said u-shaped mainframe and having a reciprocating output connected to said proximal end of said saw blade,
    support means mounted to said u-shaped mainframe and extending outward therefrom being attached to and supporting said distal end of said saw-blade; and wherein,
    said support means includes a generally c-shaped frame having a first leg with a first end portion thereon and a second leg with a second end portion thereon, said c-shaped frame further includes a lateral portion extending between said first leg and said second leg with said lateral portion spaced apart from said hack-saw blade and said second end portion attached to and supporting said distal end of said saw blade; and further comprising spring means mounted to said second end portion of said second leg and receiving said distal end of said saw blade, being operable to move said saw blade in a direction opposite to forced movement of said saw blade by said motor means; and wherein,
    said spring means includes a first mount reciprocably mounted to said second end portion of said second leg with said distal end of said saw blade removably connected to said first mount,
    said spring means further includes a spring connected to said first mount and operable to push said saw blade in a direction towards said motor means but yieldable to allow said motor means to push said first mount and said saw blade away from said motor means.

2. The hack-saw of claim 1 wherein:
    said u-shaped mainframe includes a casing, said mainframe casing is u-shaped having a first leg with a first end portion thereon and has a second leg with a second end portion thereon,
    said first leg of u-shaped mainframe casing houses said motor means and said second leg of u-shaped mainframe casing houses on-off switch for said motor means, and includes
    a lateral portion extending between said first leg of u-shaped mainframe casing and said second leg of u-shaped mainframe casing with said lateral portion of u-shaped mainframe casing spaced apart from said lateral portion of c-shaped frame and wherein,
    said first leg of u-shaped mainframe casing and said second leg of u-shaped mainframe casing runs parallel with said second leg of said c-shaped frame wherein,
    said first leg of said c-shaped frame and said second leg of said u-shaped mainframe casing are interconnected.

3. The hack-saw of claim 2 wherein:
    said c-shaped frame has an outwardly extending roller arm which is fixedly mounted at base of said second end portion of c-shaped frame directly above said spring means and extends outwardly parallel in line with said lateral portion of said c-shaped frame and said hack-saw blade; and further comprising
    a stabilizer roller rotatably mounted to said roller arm which comes in contact with said hack-saw blade while said hack-saw blade is connected at said distal end.

4. The hack-saw of claim 2 wherein:
    said first leg of u-shaped mainframe casing has a base,
    said u-shaped mainframe casing has an outwardly extending roller arm which is fixedly mounted at the base of said first leg of u-shaped mainframe casing directly above said reciprocating output and extends outwardly parallel in line with said lateral portion of said c-shaped frame and said hack-saw blade; and further comprising
    a stabilizer roller rotatably mounted to said roller arm which comes in contact with said hack-saw blade while said hack-saw blade is connected at said proximal end.

* * * * *